O. NEUVIANS.
SHOCK EQUALIZER.
APPLICATION FILED AUG. 25, 1913.
1,111,852.
Patented Sept. 29, 1914.
*Fig. I.*
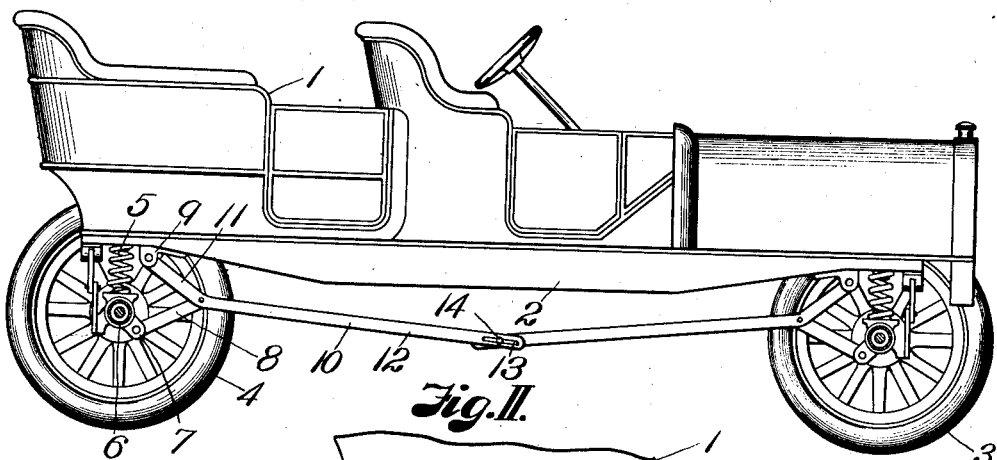
*Fig. II.*
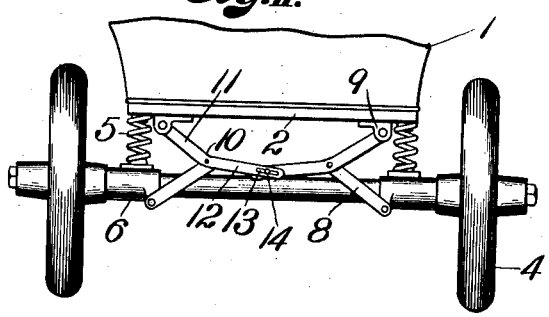
*Fig. III.*
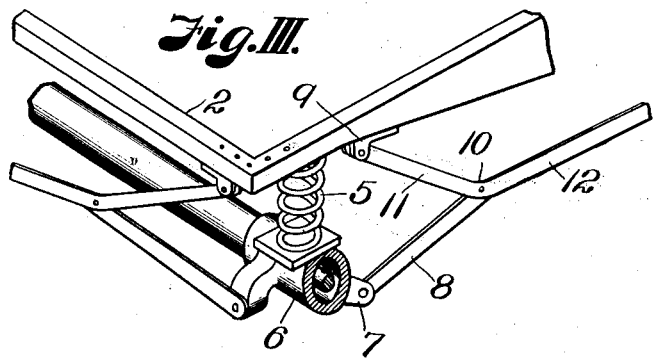
WITNESSES:
Arthur W. Caps.
L. E. Coats.
INVENTOR
Otto Neuvians.
ATTORNEY

UNITED STATES PATENT OFFICE.

OTTO NEUVIANS, OF AGENDA, KANSAS.

SHOCK-EQUALIZER.

1,111,852.  Specification of Letters Patent.  Patented Sept. 29, 1914.

Application filed August 25, 1913. Serial No. 786,448.

*To all whom it may concern:*

Be it known that I, OTTO NEUVIANS, a citizen of the United States, residing at Agenda, in the county of Republic and State of Kansas, have invented certain new and useful Improvements in Shock-Equalizers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a shock equalizer for vehicles, and has for its principal object to provide a device whereby the shock at one portion of a vehicle, occasioned by the dropping of one of the vehicle wheels to an elevation lower than the others, may be transmitted equally to other portions of the vehicle and thereby obviate tilting of the vehicle and undue strain on the part from which the shock originates. In accomplishing this object I have provided improved details of structure, the preferred form of which is illustrated in the accompanying drawings, wherein:—

Figure I is a side elevation of the vehicle equipped with my improved equalizer; the wheels at the front of the view being omitted for better illustration. Fig. II is an end view of the vehicle, showing the rear cross equalizer. Fig. III is a detail perspective of a corner of the vehicle frame and axle, showing parts of a cross and side equalizer.

Referring more in detail to the parts:— 1 designates the body of an automobile, 2 the underframe, 3 and 4 the front and rear axles respectively, and 5 ordinary vehicle springs for supporting the underframe and body.

Mounted on the ends of the axles are collars 6, having forwardly and rearwardly directed bosses 7 for carrying links 8, and mounted on the under face of the frame 2 are yokes 9 for carrying bell crank levers 10, comprising short arms 11, of substantially the same length as the links 8, and long arms 12 having slots 13 at their free ends. The links 8 are pivotally connected with relative bell crank levers 10 at the apices thereof, and the forwardly and rearwardly directed long arms 12 of the relative side and cross levers are connected by pins 14 which project through the slots and anchor the ends of the levers together. In this manner each of the rear and front corners is connected with its opposite rear or front corner, and also with the other front or rear corner on the same side of the frame, so that a shock to any one of the wheels may be transmitted longitudinally and transversely to equalize the shock under the entire vehicle.

To better illustrate the manner of equalization, we will presume that the left fore wheel of the vehicle should drop into a rut, so that a corner of the body of the vehicle would be suddenly lowered. When the corner is lowered, the short arms 11 of the adjacent bell crank levers 10 pivot on their connection with the links 8, so that the long arms of the levers are raised, thereby lifting the long arms of the levers with which they are connected and lowering the short arms of the connected levers, so that the rear left corner and forward right corner of the vehicle body are drawn downwardly simultaneously with the lowering of the left fore corner. Inasmuch as both of the last named corners are both connected with the rear right-hand corner of the body, the last named corner will be lowered by the crank members on the two equalizing units which have been originally actuated by the left fore wheel; in this way equalizing the shock throughout the entire body of the vehicle.

It is apparent that the equalizer will operate reversely to serve as a shock absorber, as the lifting of the body by reaction of the springs will serve to spread the short arms of the bell crank levers from their links and move the long arms downwardly to spread the connected units, and thereby equalize the return shock throughout the body in the same manner that the direct shock is equalized when one of the wheels drops into a rut or hole.

With the long arms provided with slots 13, the extent of travel of the long arms of the bell crank levers may be varied in order to adjust the equalizing action; the slotted construction also adapting a stock size of equalizer for cars of different length.

Having thus described my invention, what I claim as new therein, and desire to secure by Letters-Patent, is:—

1. In a shock equalizer, the combination with a vehicle body and axles, of an individual lever mechanism pivotally mounted at each corner of the vehicle with one arm of each lever connected with a like arm of another lever, and means for connecting each of said levers with the vehicle axle adjacent its body mounting.

2. In a shock equalizer, the combination with a vehicle body and axles, of a lever pivotally connected with the body at each corner thereof and extending longitudinally relative thereto, and having slidable connection with a like lever having pivotal mounting on the body, and means connecting each of said levers with an adjacent axle.

3. In a shock equalizer, the combination with a vehicle body and axles, of a lever having one end pivotally connected with the body and its opposite end connected with a like arm of a lever having like mounting on the vehicle, and a link connecting said lever with the axle adjacent its body mounting.

4. In a shock equalizer, the combination with a vehicle body and axles, of longitudinally and transversely extending bell crank levers pivotally mounted on the body at each corner thereof and adjacent the axles, means connecting the free ends of the longitudinal and of the transverse levers, and links pivotally supported on the axles and connected with the bell crank levers.

5. In a shock equalizer, the combination with a vehicle body and axles, of collars on the ends of the axles, bell crank levers pivotally mounted on the body and connected in pairs, and links having their ends pivotally mounted on said collars and connected with the bell crank levers, substantially as set forth.

6. In a shock equalizer, the combination with a vehicle body and axles, of collars on the ends of said axles having bosses projecting forwardly and rearwardly therefrom, longitudinally and transversely extending bell crank levers pivotally mounted on said body adjacent each corner thereof, with the free ends of the relative levers connected, and links pivotally mounted on said bosses and pivotally connected with the respective longitudinal and transverse levers, substantially as set forth.

In testimony whereof I affix my signature in presence of two witnesses.

OTTO NEUVIANS.

Witnesses:
C. A. BAIRD,
E. E. BAIRD.